(12) United States Patent
Li et al.

(10) Patent No.: US 9,515,504 B2
(45) Date of Patent: Dec. 6, 2016

(54) BATTERY CHARGER WITH POWER FACTOR CORRECTION

(71) Applicant: Macau University of Science and Technology, Macau (MO)

(72) Inventors: Xiaodong Li, Macau (MO); Song Hu, Macau (MO)

(73) Assignee: Macau University of Science and Technology, Macau (MO)

( * ) Notice: Subject to any disclaimer, the term of this patent is extended or adjusted under 35 U.S.C. 154(b) by 149 days.

(21) Appl. No.: 14/622,934

(22) Filed: Feb. 16, 2015

(65) Prior Publication Data

US 2016/0211690 A1 Jul. 21, 2016

Related U.S. Application Data

(60) Provisional application No. 62/104,851, filed on Jan. 19, 2015.

(51) Int. Cl.
| | |
|---|---|
| *H02J 7/00* | (2006.01) |
| *H02J 7/04* | (2006.01) |
| *H02J 7/16* | (2006.01) |
| *H02M 1/42* | (2007.01) |
| *H02M 3/335* | (2006.01) |
| *H02M 3/337* | (2006.01) |

(52) U.S. Cl.
CPC .............. *H02J 7/0052* (2013.01); *H02M 1/42* (2013.01); *H02M 1/4258* (2013.01); *H02M 3/337* (2013.01); *H02M 3/33576* (2013.01)

(58) Field of Classification Search
CPC ........................................................ H04M 1/42
USPC ......................................................... 320/107
See application file for complete search history.

(56) References Cited

U.S. PATENT DOCUMENTS

2012/0249059 A1* 10/2012 Matsumae ............ H02M 3/337
    320/107
2013/0057200 A1* 3/2013 Potts .................. H02M 3/33584
    320/107

* cited by examiner

*Primary Examiner* — Edward Tso
*Assistant Examiner* — Ahmed Omar
(74) *Attorney, Agent, or Firm* — Ella Cheong Hong Kong; Sam T. Yip

(57) ABSTRACT

A battery charger with power factor correction is provided. In particular, the battery charger is configured to work in a discontinuous current mode with a power factor that is almost unity but no bulky electrolytic capacitor is needed in the charger. The charger has a rectification circuit producing a rectified voltage to a first controllable switching circuit, whose output is fed to a series resonant tank series-connecting a first winding of a high-frequency transformer. The second winding thereof is connected to a second controllable switching circuit, whose output is a DC voltage for battery charging. The charger includes a control unit for generating a first control signal and a second control signal to control the first and the second controllable switching circuits, respectively, such that the current flowing in the first winding is substantially phase-aligned with the first control signal's waveform, thereby facilitating power factor correction.

19 Claims, 10 Drawing Sheets

BATTERY CHARGER WITH POWER FACTOR CORRECTION

CROSS-REFERENCE TO RELATED APPLICATIONS

This application claims the benefit of U.S. Provisional Patent Application No. 62/104,851, filed on Jan. 19, 2015, which is herein incorporated by reference in its entirety.

FIELD OF THE INVENTION

The present invention relates to a battery charger circuit and a control method for the circuit to perform power factor correction.

BACKGROUND

As an important measurement to reduce carbon emission, electrification of transportation system is an irreversible developing trend in modern society. Battery technologies and related charging methods are key to promote the electric vehicle in the market. With more and more grid-tied battery chargers put in operation, pollution to the AC grid system should be depressed as much as possible through power factor correction. The power factor is defined as the ratio of the real power flowing to the load to the apparent power in the circuit, and is a dimensionless number in the closed interval of −1 to 1. An AC system with a lower power factor draws more current than a system with a higher power factor when a same amount of power is transferred. Generally, the power factor is desired to be 1 for any grid-tied AC system.

FIG. 1 illustrates a schematic of a conventional AC/DC charger circuit with power factor correction. It contains a diode rectifier circuit, a high-frequency filter, a boost DC/DC converter, a stable DC-link capacitor and a DC/DC converter. By using the diode rectifier, the AC voltage $v_{ac}$ is rectified to a DC voltage $V_{in}$, which has a waveform of the absolute value of the input AC voltage $v_{ac}$. The subsequent boost converter includes an inductor $L_b$, a switch $Q_b$, and a diode D. By controlling the ratio of the on-time to the off-time of the switch $Q_b$, two objectives are realizable: (1) the variation of the current $i_b$ flowing in $L_b$ can follow the change of $V_{in}$ and be in phase with $V_{in}$; and (2) at the same time, the voltage across $C_{dc}$ can be maintained constant. The last-stage DC/DC converter should be controlled to regulate the output charging current. Due to the boosting function of the boost DC/DC converter, the DC-link voltage $V_{dc}$ is higher than the peak value of the input AC voltage $v_{ac}$. To keep such a voltage stable, a large electrolytic capacitor is required to be used for $C_{dc}$. Such large electrolytic capacitor has a short life span. The presence of the electrolytic capacitor also provides a means to adjust the power factor to approach unity.

It is advantageous if the power factor for a battery charger is correctable or adjustable to be close to unity without using a large electrolytic capacitor.

SUMMARY OF THE INVENTION

In the present invention, a battery charger operating with a single-phase AC power source is disclosed. The battery charger converts an AC voltage to a DC output voltage usable for battery charging, the AC voltage having an AC frequency and being obtainable from the AC power source. In particular, the battery charger is configured to work in a discontinuous current mode with a power factor that is almost unity but no bulky electrolytic capacitor is needed in the charger.

The battery charger comprises a control unit, a rectification circuit, a first controllable switching circuit, a high-frequency transformer, a series resonant tank having a resonating inductor and a resonating capacitor connected in series, and a second controllable switching circuit.

The control unit is configured to generate a first control signal and a second control signal. Each of the two control signals is substantially similar to a periodic pulse train. An instantaneous signal value of each of the two control signals indicates either a first required configuration RC1 or a second required configuration RC2. The two control signals are substantially mutually-synchronized with a time delay between the two control signals.

The rectification circuit is used for rectifying the AC voltage to thereby generate a rectified voltage across two output terminals of the rectification circuit.

The first controllable switching circuit has P1in1 and P1in2 as two input ports and P1out1 and P1out2 as two output ports. The two input ports are one-by-one coupled to the two output terminals of the rectification circuit for receiving the rectified voltage. The first controllable switching circuit is reconfigurable in response to the first control signal. The first control signal having the instantaneous signal value that indicates RC1 configures the first controllable switching circuit to connect P1in1 to P1out1, and P1in2 to P1out2. The first control signal having the instantaneous signal value that indicates RC2 configures the first controllable switching circuit to connect P1in1 to P1out2, and P1in2 to P1out1.

The high-frequency transformer has a first winding and a second winding, each of the two windings having two terminals. The series resonant tank is further series-connected to the first winding to give a resultant cascade. The cascade has two ends connected to P1out1 and P1out2 for allowing an exciting current to flow through the cascade to excite the second winding.

The second controllable switching circuit has P2in1 and P2in2 as two input ports one-by-one connected to the two terminals of the second winding, and has P2out1 and P2out2 as two output ports such that the DC output voltage is obtainable across P2out1 and P2out2. The second controllable switching circuit is reconfigurable in response to the second control signal. When a voltage difference measured from P1out1 to P1out2 is substantially higher than zero, the second control signal having the instantaneous signal value that indicates RC1 configures P2in1 and P2in2 to be shorted together, and P2out1 and P2out2 to be disconnected from any of P2in1 and P2in2. When the voltage difference is substantially higher than zero, the second control signal having the instantaneous signal value that indicates RC2 configures P2in1 to connect to P2out1, and P2in2 to connect to P2out2. When the voltage difference is substantially lower than zero, the second control signal having the instantaneous signal value that indicates RC1 configures P2in1 to connect to P2out1, and P2in2 to connect to P2out2. When the voltage difference is substantially lower than zero, the second control signal having the instantaneous signal value that indicates RC2 configures P2in1 and P2in2 to be shorted together, and P2out1 and P2out2 to be disconnected from any of P2in1 and P2in2.

The control unit is further configured to real-time adjust the time delay such that the exciting current has a waveform substantially phase-aligned with the AC voltage's waveform, causing an AC current drawn from the AC source to be substantially in-phase with the AC voltage to thereby facilitate power factor correction.

Other aspects of the present invention are disclosed as illustrated by the embodiments hereinafter.

DETAILED DESCRIPTION

An aspect of the present invention is to provide a battery charger with power factor correction without a need to incorporate a bulky electrolytic capacitor therein. Advantageously, the battery charger as disclosed herein is configured to work in a discontinuous current mode with a power factor that is almost unity.

The present invention is illustrated by first detailing an exemplary circuit realization of the battery charger. Thereafter, this circuit realization is generalized to provide a functional description of the disclosed charger in a block-schematic form.

Figure 1:
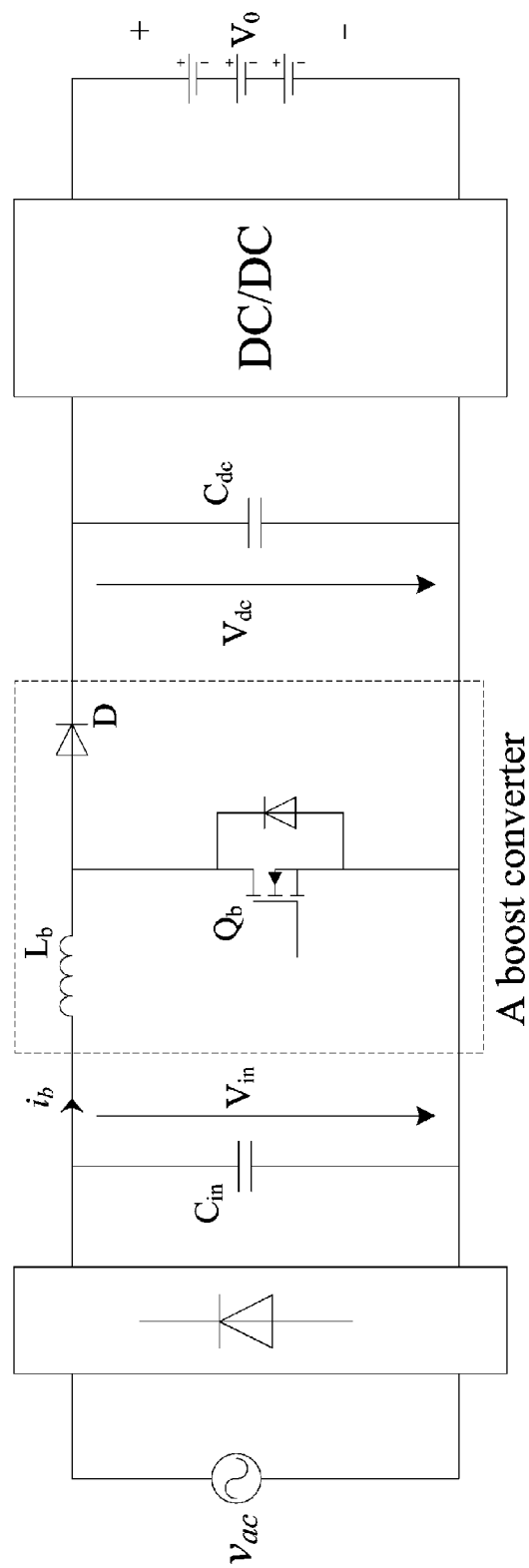
FIG. 1 is a schematic of a conventional battery charger with power factor correction.
Figure 2:
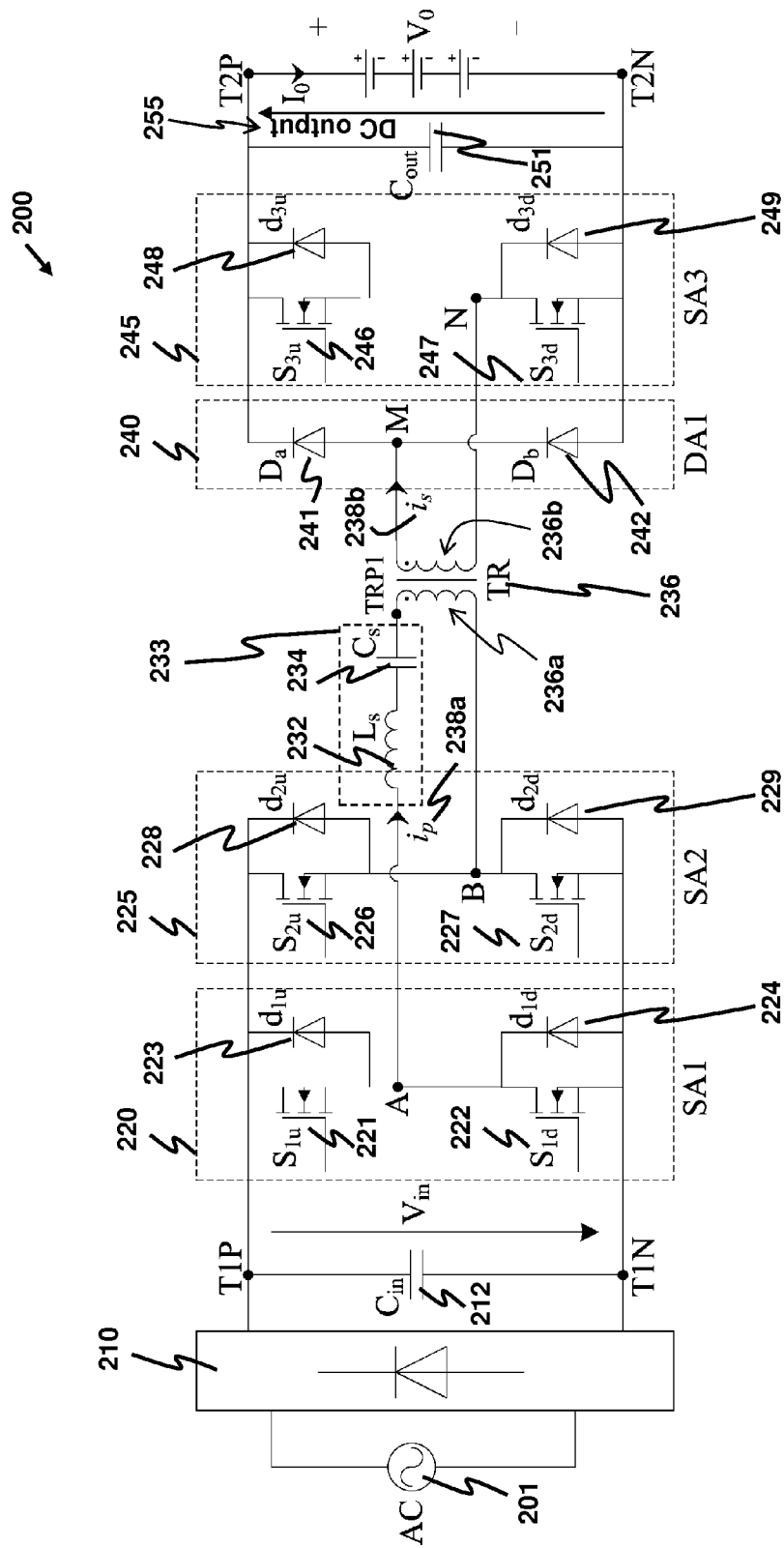
FIG. 2 is a circuit schematic of a battery charger with power factor correction in accordance with one embodiment of the present invention.

FIG. 2 depicts the exemplary circuit realization of the battery charger. A battery-charger circuit 200 comprises a full-wave diode rectifier 210 whose inputs are connected to a single-phase AC source 201, and a high-frequency filter $C_{in}$ 212 connected between a positive end T1P and a negative end T1N of output terminals of the diode rectifier 210. A positive DC voltage difference is provided between T1P and T1N. The two ends T1P and T1N are connected to a first switch arm SA1 220 and a second switch arm SA2 225. The first switch arm SA1 220 comprises a first switch S1u 221 and a second switch S1d 222. The second switch arm SA2 225 comprises a third switch S2u 226 and a fourth switch S2d 227. The switches S1u 221, S1d 222, S2u 226 and S2d 227 are configured to be switched on and off at a switching frequency. The switching frequency that is selected varies from one design to another, depending on practical consideration such as the allowable switching frequency of each switch. Typically, the switching frequency is selected to be in the range of 50 kHz to 200 kHz. A series resonant tank 233, comprising a resonating inductor $L_s$ 232 and a resonating capacitor $C_s$ 234, is connected between node A (i.e. the midpoint of SA1 220) and node TRP1. Preferably and in most of the designs of the charger 200, the series resonant tank 233 is selected to have a resonant frequency close to the switching frequency. A diode arm DA1 240, comprising a first diode Da 241 and a second diode Db 242, is connected between a positive end T2P and a negative end T2N of a DC output 255, providing a DC voltage for battery charging. A third switch arm SA3 245, comprising a fifth switch S3u 246 and a sixth switch S3d 247, is connected between the positive end T2P and the negative end T2N of the DC output 255. The switches S3u 246 and S3d 247 are also configured to be switched on and off at the aforementioned switching frequency. Each of the six switches S1u 221, S1d 222, S2u 226, S2d 227, S3u 246 and S3d 247 may be realized as a metal oxide semiconductor field effect transistor (MOSFET). Preferably, the first switch S1u 221, the second switch S1d 222, the third switch S2u 226, the fourth switch S2d 227, the fifth switch S3u 246 and the sixth switch S3d 247 are protected by protection diodes d1u 223, d1d 224, d2u 228, d2d 229, d3u 248 and d3d 249, respectively. The circuit 200 further comprises a high-frequency transformer TR 236 with two windings (a first winding 236a and a second winding 236b) for providing galvanic isolation between the AC source 201 and the DC output 255. The first winding 236a is connected between node B (the midpoint of SA2 225) and node TRP1. The second winding 236b is connected between node M (the midpoint of the diode arm DA1) and node N (the midpoint of SA3 245). The turn ratio of TR 236 may be designed to meet the requirements of different input-output voltage ratios. Preferably, a high-frequency capacitor $C_{out}$ 251 is connected between the positive end T2P and the negative end T2N of the DC output 255 for reducing undesirable high-frequency disturbances at the DC output 255.

Figure 3:
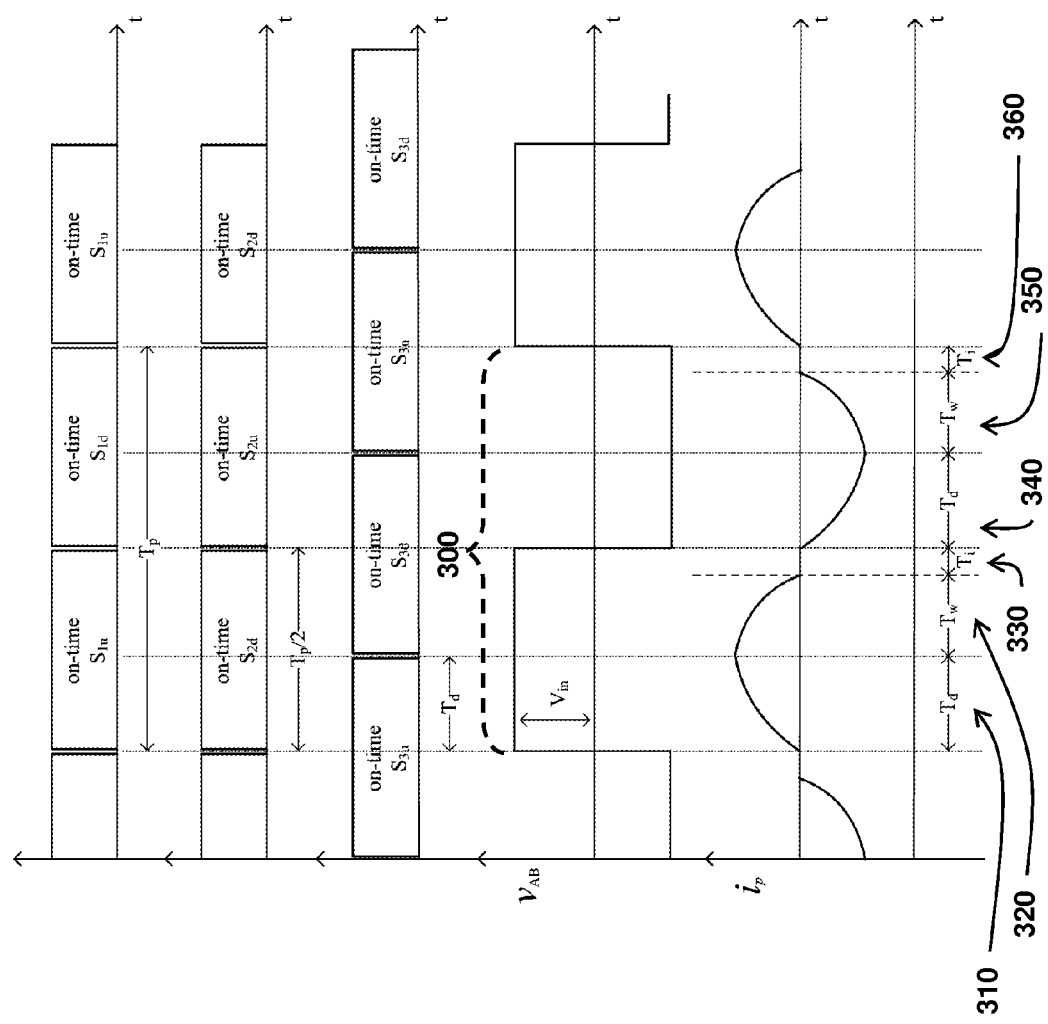
FIG. 3 depicts the operating waveforms at different points of the battery charger of FIG. 2.

FIG. 3 depicts voltage and current waveforms at different points of the circuit 200 during operation. All the six switches S1u 221, S1d 222, S2u 226, S2d 227, S3u 246 and S3d 247 have a same switching period $T_p$. A full switching period $T_p$ starts from the turn-on moment of S1u 221 and ends at the next turn-on moment of S1u 221. The two switches S1u 221 and S1d 222 in SA1 220 are turned on and off complementarily with a nearly 50% duty ratio, although it is necessary to provide a short dead-gap time between the turn-off moment of one switch and the turn-on moment of another switch. Similarly, the two switches S2u 226 and S2d 227 in SA2 225 are turned on and off complementarily with a nearly 50% duty ratio, though it is also necessary to provide a short dead-gap time between the turn-off moment of one switch and the turn-on moment of another switch. In addition, the two switches S3u 246 and S3d 247 in SA3 245 are turned on and off complementarily with a nearly 50% duty ratio, although it is necessary to provide a short dead-gap time between the turn-off moment of one switch and the turn-on moment of another switch. The two switches S1u 221 and S2d 227 are time-synchronized in turning on and off. The two switches S1d 222 and S2u 226 are also time-synchronized in turning on and off. The time duration (or the time delay) from the turn-on moment of S1u 221 to the turn-on moment of S3d 247 in one switching period $T_p$ is denoted as $T_d$, where $T_d$ is always positive and varies between 0 and $T_p/2$. Every one switching period $T_p$ can be partitioned into six time sections. As seen in FIG. 3, a first time section 310, a second time section 320, a third time section 330, a fourth time section 340, a fifth time section 350 and a sixth time section 360 are sequentially arranged over a switching cycle period 300.

The waveforms shown in FIG. 3 are explained with the aid of FIGS. 4-9, each of which is an equivalent schematic showing the operation of the battery charger circuit over an individual time section under consideration. Denote $i_p$ 238a as a current flowing through the first winding 236a of TR 236, and $i_s$ 238b as a current flowing through the second winding 236b thereof.

Figure 4:
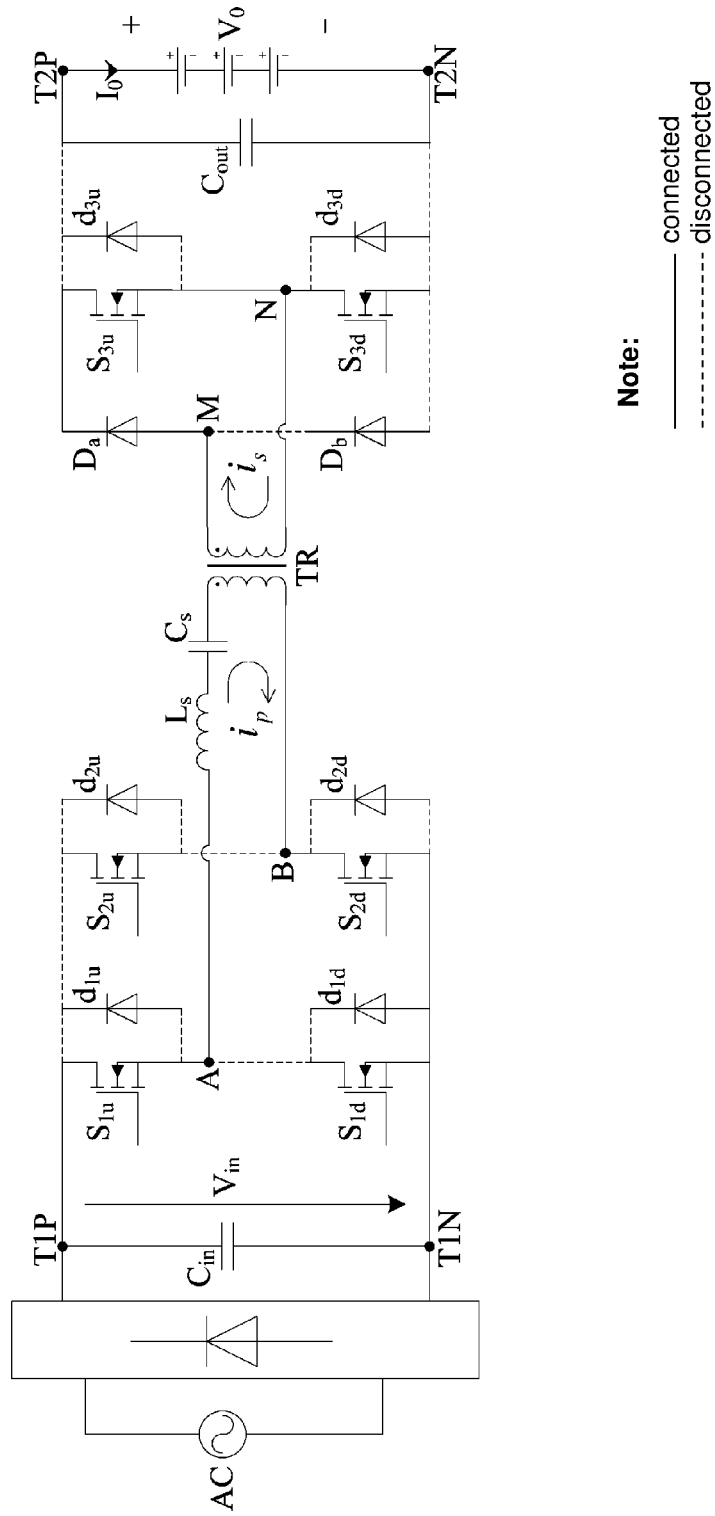
FIG. 4 is an equivalent schematic of the circuit of FIG. 2 when the battery charger is operated during a first time section 310 of a switching cycle period 300.

FIG. 4 is an equivalent schematic of the circuit 200 when the circuit 200 is operated during the first time section 310. The first time section 310 begins when S1u 221 and S2d 227 are turned on and ends when S3u 246 is turned off. During this time section, $i_p$ 238a or $i_s$ 238b increases from zero and flows through S1u 221, S2d 227, Da 241 and S3u 246. The duration of the first time section 310 is $T_d$.

Figure 5:
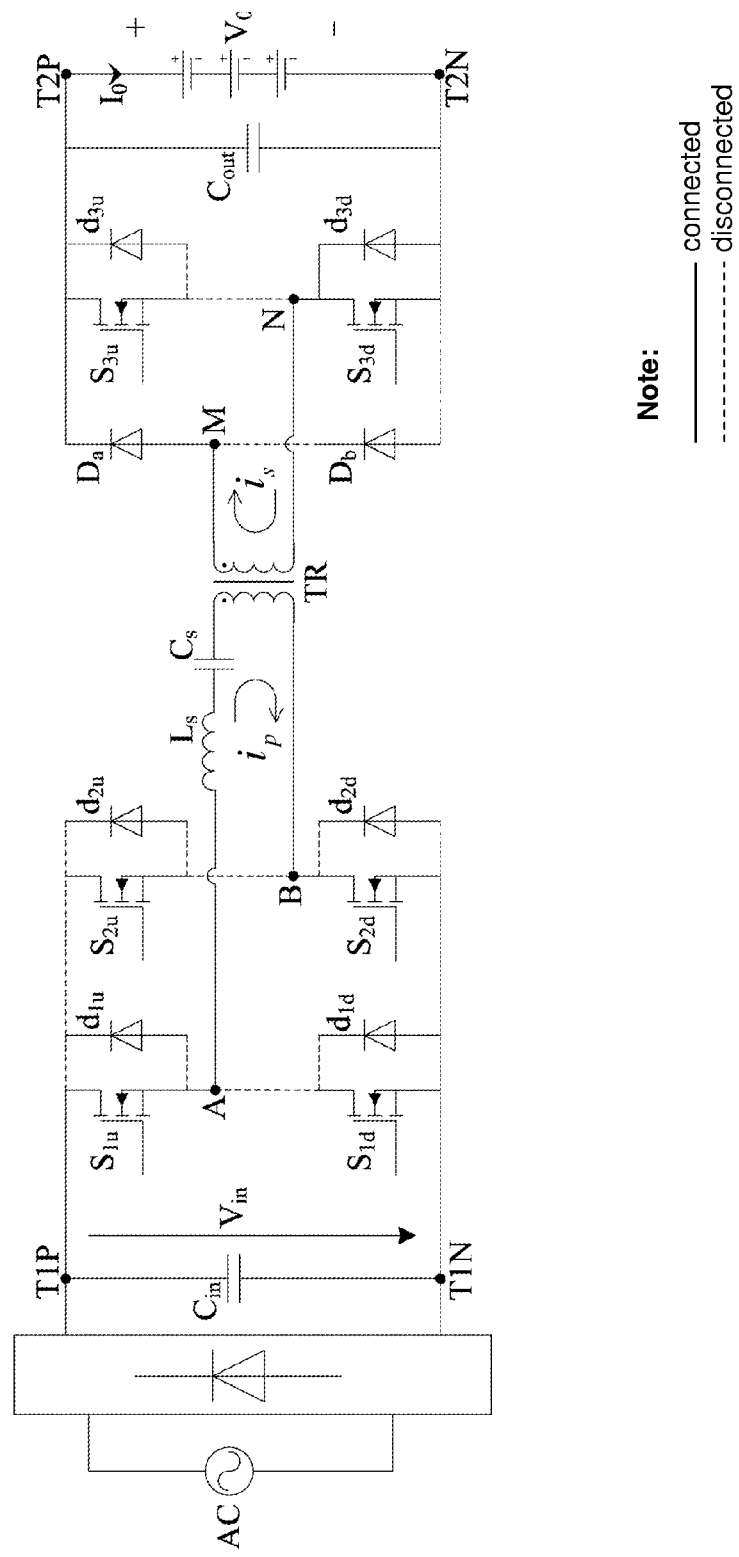
FIG. 5 is an equivalent schematic of the circuit of FIG. 2 when the battery charger is operated during a second section 320 of the switching cycle period 300.

FIG. 5 is an equivalent schematic of the circuit 200 when the circuit 200 is operated during the second time section 320. The second time section 320 begins when S3d 247 is turned on and ends when reaches zero. During this time section, the current $i_p$ 238a or $i_s$ 238b decreases from some value to zero, and flows through S1u 221, S2d 227, Da 241 and S3d 247. The duration of the second time section 320 is $T_w$.

Figure 6:
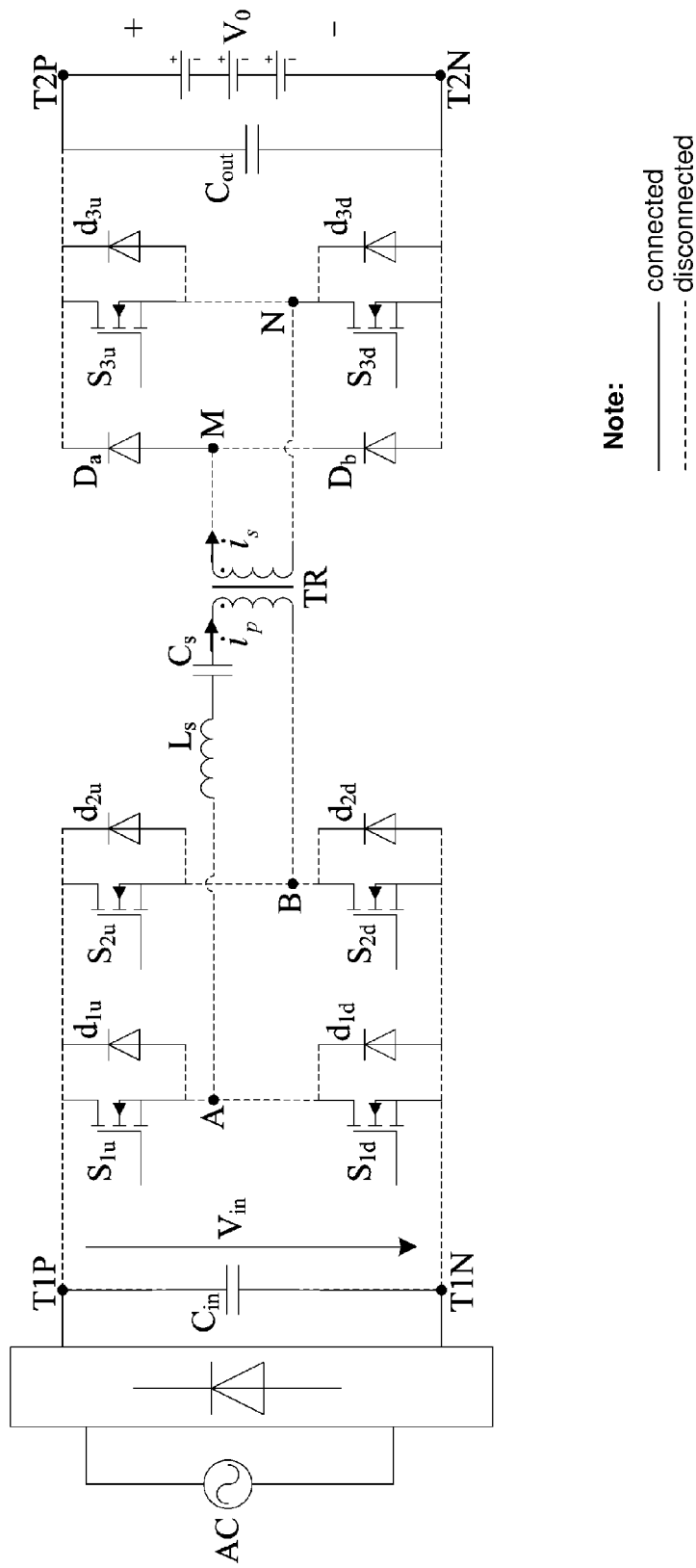
FIG. 6 is an equivalent schematic of the circuit of FIG. 2 when the battery charger is operated during a third section 330 of the switching cycle period 300.

FIG. 6 is an equivalent schematic of the circuit 200 when the circuit 200 is operated during the third time section 330. The third time section 330 begins when $i_s$ 238b reaches zero and ends when S1u 221 and S2d 227 are turned off with zero current. The current $i_p$ or $i_s$ remains zero during this time section. The duration of the third time section 330 is $T_i$.

Figure 7:
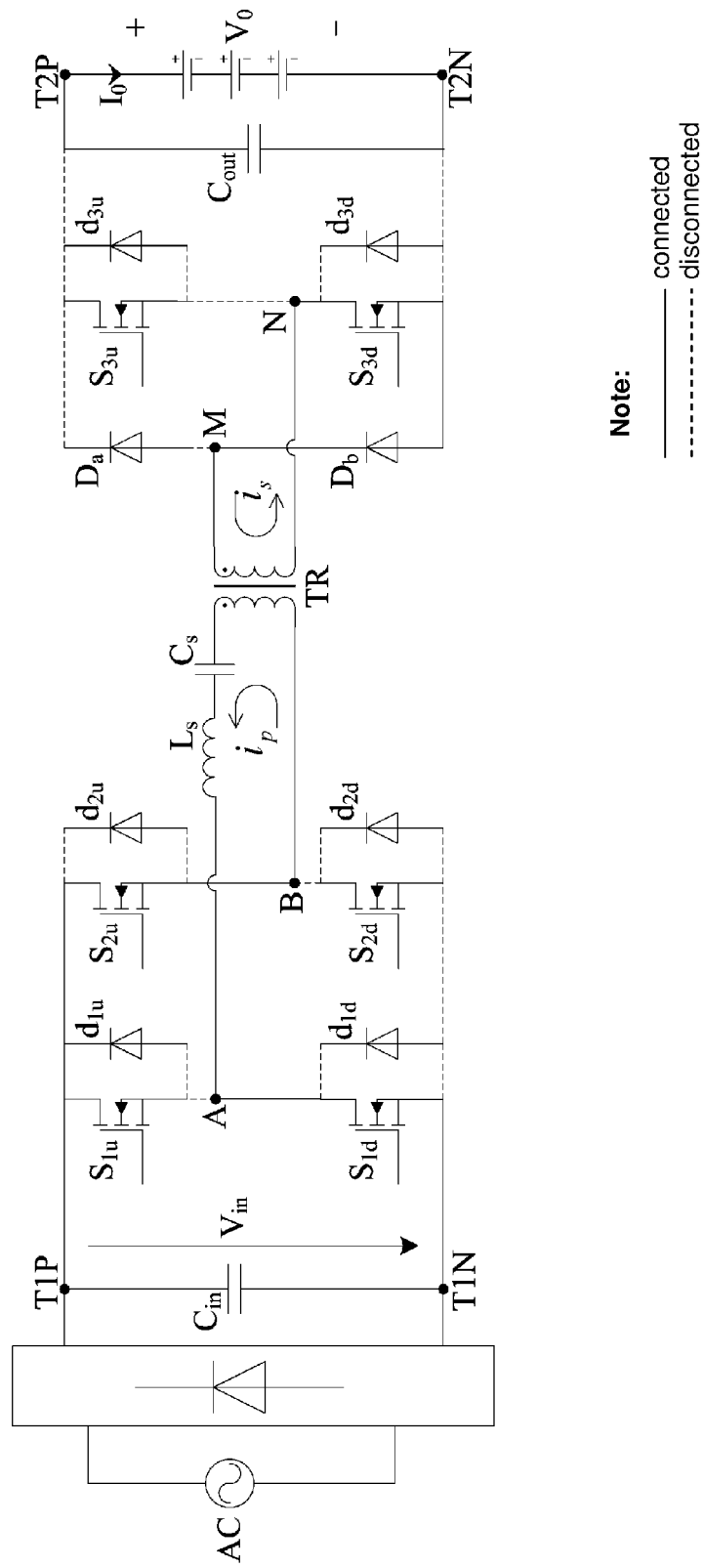
FIG. 7 is an equivalent schematic of the circuit of FIG. 2 when the battery charger is operated during a fourth section 340 of the switching cycle period 300.

FIG. 7 is an equivalent schematic of the circuit 200 when the circuit 200 is operated during the fourth time section 340. The fourth time section 340 begins when S1d 222 and S2u 226 are turned on and ends when S3d 247 is turned off. The current $i_p$ 238a or $i_s$ 238b increases from zero, and flows through S1d 222, S2u 226, Db 242 and S3d 247 during this time section. The duration of the fourth time section 340 is $T_d$.

Figure 8:
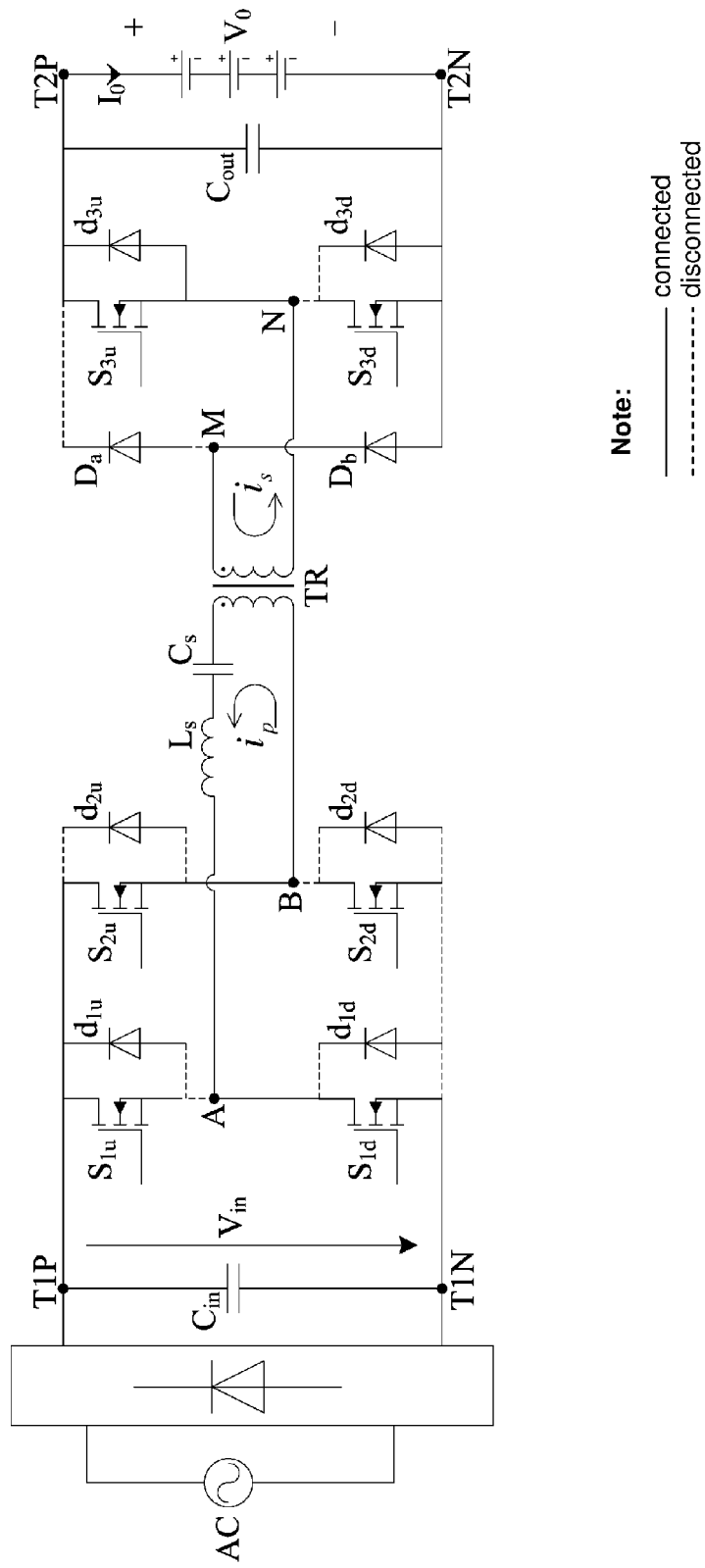
FIG. 8 is an equivalent schematic of the circuit of FIG. 2 when the battery charger is operated during a fifth section 350 of the switching cycle period 300.

FIG. 8 is an equivalent schematic of the circuit 200 when the circuit 200 is operated during the fifth time section 350. The fifth time section 350 begins when S3u 246 is turned on and ends when $i_s$ 238b reaches zero. The current $i_p$ 238a or $i_s$ 238b decreases from some value, and flows through S1d 222, S2u 226, Db 242 and S3u 246 during this time section. The duration of the fifth time section 350 is $T_w$.

Figure 9:
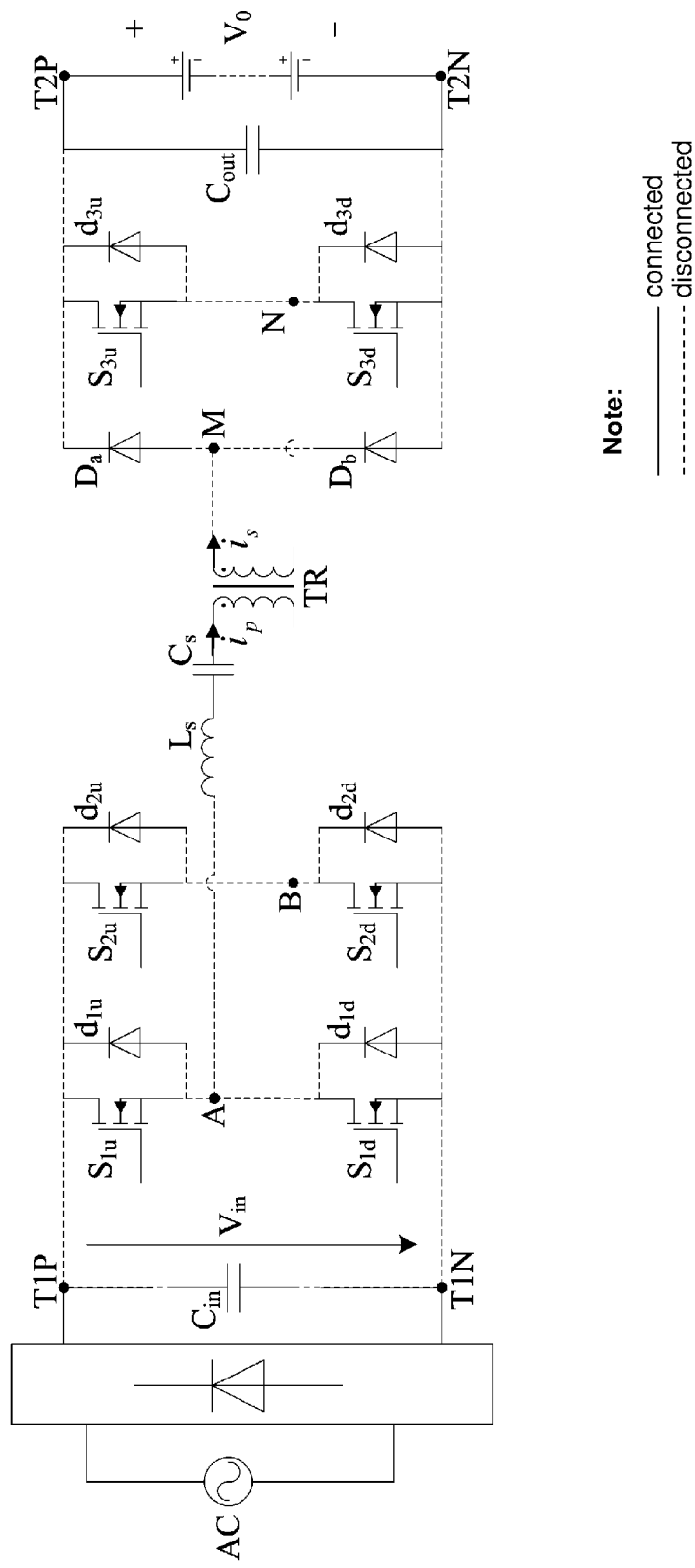
FIG. 9 is an equivalent schematic of the circuit of FIG. 2 when the battery charger is operated during a sixth section 360 of the switching cycle period 300.

FIG. 9 is an equivalent schematic of the circuit 200 when the circuit 200 is operated during the sixth time section 350. The sixth time section 350 begins when $i_s$ 238b reaches zero and ends when S1d 222 and S2u 226 are turned off with zero current. The current $i_p$ 238a or $i_s$ 238b remains zero during this time section. The duration of the sixth time section 360 is $T_i$.

It is preferable that the circuit 200 be designed to make sure that $T_i$ is greater than or equal to zero at a full load and a minimum voltage gain. The minimum voltage gain refers to an operating condition that the input AC voltage of the AC source 201 reaches its maximum $V_M$ and the DC output 255 supplies a voltage (i.e. the voltage of one or more batteries under charging) that is minimum.

Under the discontinuous current operation as detailed above, S1u 221, S1d 222, S2u 226, S2d 227, Da 241 and Db 242 can be turned on and off with zero current, while S3d 247 and S3u 246 can be turned on and off softly. As used herein, the term "softly" refers to a condition that a voltage and a current of a switch do not have abrupt change during turning on and turning off. Soft switching of all the switches 221, 222, 226, 227, 246, 247 and the diodes 241, 242 reduces switching loss, thus enabling the circuit 200 to work at a possible higher frequency. The advantage of operating the circuit 200 at a high frequency is that the resonating inductor 232, the resonating capacitor 234 and the transformer 236 can be selected to have reduced sizes.

With a knowledge of the input AC voltage (magnitude and phase) and the output voltage (i.e. the battery voltage), the time delay $T_d$ is to be controlled continuously in each half cycle of the AC voltage (10 ms for a 50 Hz AC grid or 8.33 ms for a 60 Hz AC grid) in order to draw an in-phase near-sinusoidal input current from the grid and to generate a DC output charging current with a certain amount of ripple. In the art, it is believed that a charging current with a low frequency ripple does not damage a rechargeable battery. Note that $T_d$ is the only parameter required to be determined and adjusted for power regulation. When the input AC voltage and the DC output voltage (i.e. the voltage of battery) are known, $T_d$ determines the values of $T_w$, $T_i$ and the average output current.

The instantaneous power levels at the input terminals of the AC source 201 and at output terminals of the DC output 255 are substantially balanced so that there is no need to use an electrolytic capacitor as a buffer of electrical energy supplied to the DC output 255. The capacitors $C_{in}$ 212 and $C_{out}$ 251 are all high-frequency filter capacitors each with a capacitance value generally no greater than 10 µF.

Figure 10:
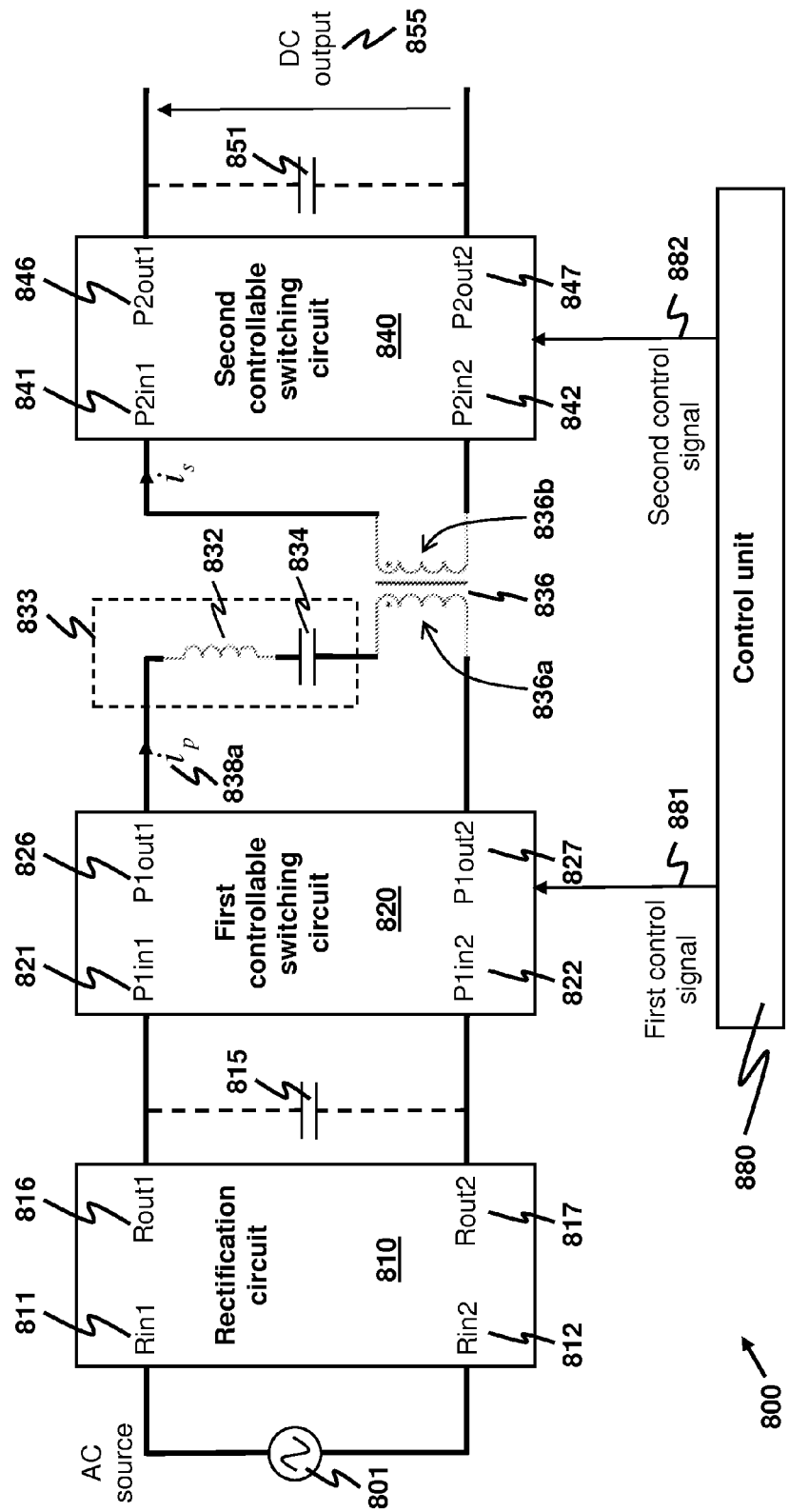
FIG. 10 depicts a schematic of a battery charger with power factor correction in accordance with an exemplary embodiment of the present invention.

Based on the circuit realization depicted in FIG. 2, an exemplary embodiment of the disclosed battery charger is elaborated as follows. FIG. 10 provides a schematic of a battery charger with power factor correction in accordance with this exemplary embodiment.

A battery charger 800 for converting an AC voltage to a DC output voltage usable for battery charging comprises a rectification circuit 810, a first controllable switching circuit 820, a second controllable switching circuit 840 and a control unit 880. The AC voltage has an AC frequency and is obtainable form an AC source 801, and the DC output voltage is produced at a DC output 855. The battery charger 800 further comprises a high-frequency transformer 836 and a series resonant tank 833.

The control unit 880 is configured to generate a first control signal 881 and a second control signal 882. Each of the two control signals 881, 882 is substantially similar to a periodic pulse train. An instantaneous signal value of each of the two control signals 881, 882 indicates either a first required configuration, denoted as RC1, or a second required configuration, denoted as RC2. For example, if the instantaneous value is above a certain threshold voltage (which, for instance, may be a voltage sufficiently high to drive a switch to switch on), this signal value can be regarded to indicate that one configuration, such as RC1 or RC2, is to be achieved. As used herein, "a required configuration" means that the first controllable switchable circuit 820, the second controllable switchable circuit 840, or both, are, or are to be, configured according to one or more pre-determined configuration details as provided, indicated or implied by this required configuration. The control unit 880 is further configured such that the two control signals 881, 882 are substantially mutually-synchronized with a time delay between the two control signals 881, 882. This time delay is exemplified as $T_d$ shown in FIG. 3.

The rectification circuit 810 is used for rectifying the AC voltage to thereby generate a rectified voltage across two output terminals (Rout1 816 and Rout2 817) of the rectification circuit. The rectification circuit 810 connects the two input terminals (Rin1 811 and Rin2 812) to the AC source 801 for receiving the AC voltage. Exemplarily, the rectification circuit 810 is a full-wave diode rectifier. Optionally, a first high-frequency capacitor 815 is connected between Rout1 816 and Rout2 817 for reducing unwanted high-frequency components in the rectified voltage.

The first controllable switching circuit 820 has P1in1 821 and P1in2 822 as two input ports and P1out1 826 and P1out2 827 as two output ports. The two input ports 821, 822 are one-to-one coupled to the two output terminals 816, 817 of the rectification circuit 810 for receiving the rectified voltage. In addition, the first controllable switching circuit 820 is reconfigurable in response to the first control signal 881. Exemplarily, the first controllable switching circuit 820 is realizable as a combination of SA1 220 and SA2 225 shown in FIG. 2.

The high-frequency transformer 836 has a first winding 836a and a second winding 836b. Each of the two windings 836a, 836b has two terminals. The series resonant tank 833 comprises a resonating inductor 832 and a resonating capacitor 834 connected in series. The series resonant circuit 833 is further series-connected to the first winding 836a to give a resultant cascade. In addition, the cascade has two ends, one being an end of the series resonant circuit 833 and the other being an end of the first winding 836a. The two ends of the cascade are respectively connected to P1out1 826 and P1out2 827 for allowing an exciting current 838a (exemplified as $i_p$ 238a of FIG. 2) to flow through the cascade to excite the second winding 836b.

The second controllable switching circuit 840 has P2in1 841 and P2in2 842 as two input ports and P2out1 846 and P2out2 847 as two output ports. In addition, the second controllable switching circuit 840 is reconfigurable in response to the second control signal 882. Exemplarily, the second controllable switching circuit 840 is realizable as a combination of DA1 240 and SA3 245 shown in FIG. 2. The two input ports 841, 842 are one-by-one connected to the two terminals of the second winding 836b. The DC output voltage 855 is obtainable across P2out1 846 and P2out2 847. Optionally, a second high-frequency capacitor 851 is connected between P2out1 846 and P2out2 847 for reducing unwanted high-frequency components in the DC output voltage 855.

Configuration details of the first controllable switching circuit 820 in response to the first control signal 881 are given as follows.

As deduced from FIGS. 4-5 and the corresponding explanation mentioned above, the first control signal 881 having the instantaneous signal value that indicates RC1 configures the first controllable switching circuit 820 to connect P1in1 821 to P1 out1 826, and P1in2 822 to P1out2 827.

As revealed from FIGS. 7-8 and the corresponding explanation mentioned above, the first control signal 881 having the instantaneous signal value that indicates RC2 configures the first controllable switching circuit 820 to connect P1in1 821 to P1out2 827, and P1in2 822 to P1out1 826.

Equivalently, the first controllable switching circuit 820 is a polarity-reversal four-port network configured according to the required configuration indicated by the first control signal 881.

Configuration details of the second controllable switching circuit 840 in response to the second control signal 882 are provided as follows. For the sake of convenience, denote a voltage difference measured from P1out1 826 to P1out2 827 be a voltage difference under consideration.

When the voltage difference under consideration is substantially higher than zero, the second control signal 882 having the instantaneous signal value that indicates RC1 configures P2in1 841 and P2in2 842 to be shorted together, and P2out1 846 and P2out2 847 to be disconnected from any of P2in1 841 and P2in2 842. This configuration detail is deduced from FIG. 3 and in particular the first time section 310, together with FIG. 4 and the corresponding description mentioned above.

When the voltage difference under consideration is substantially higher than zero, the second control signal 882 having the instantaneous signal value that indicates RC2 configures P2in1 841 to connect to P2out1 846, and P2in2 842 to connect to P2out2 847. This configuration detail is deduced from FIG. 3 and in particular the second time section 320, together with FIG. 5 and the corresponding description mentioned above.

When the voltage difference under consideration is substantially lower than zero, the second control signal 882 having the instantaneous signal value that indicates RC1 configures P2in1 841 to connect to P2out1 846, and P2in2 842 to connect to P2out2 847. This configuration detail is deduced from FIG. 3 and in particular the fifth time section 350, together with FIG. 8 and the corresponding description mentioned above.

When the voltage difference under consideration is substantially lower than zero, the second control signal 882 having the instantaneous signal value that indicates RC2 configures P2in1 841 and P2in2 842 to be shorted together, and P2out1 846 and P2out2 847 to be disconnected from any of P2in1 841 and P2in2 842. This configuration detail is deduced from FIG. 3 and in particular the fourth time section 340, together with FIG. 7 and the corresponding description mentioned above.

To facilitate power factor correction, the control unit 880 is further configured to real-time adjust the time delay such that, as deduced from FIG. 3, the exciting current 838a has a waveform substantially phase-aligned with the waveform of the first control signal 881. As used herein, "real-time adjusting" the time delay means that the value of the time delay is re-examined and updated periodically with a pre-determined period. Preferably, this pre-determined period is a half-cycle time of the AC voltage received from the AC source 801.

As mentioned above, an exemplary realization of the first controllable switching circuit 820 is a combination of SA1 220 and SA2 225. By this realization, the first controllable switching circuit 820 comprises a first switch connected between P1in1 821 and P1out1 826, a second switch connected between P1in2 822 and P1out1 826, a third switch connected between P1in1 821 and P1out2 827, and a fourth switch connected between P1in2 822 and P1out2 827. The first control signal 881 having the instantaneous signal value that indicates RC1 configures the first switch and the fourth switch to be switched on, and configures the second switch and the third switch to be switched off. Additionally, the first control signal 881 having the instantaneous signal value that indicates RC2 configures the first switch and the fourth switch to be switched off, and configures the second switch and the third switch to be switched on.

It is also mentioned above that an exemplary realization of the second controllable switching circuit 840 is a combination of DA1 240 and SA3 245. By this realization, the second controllable switching circuit 840 comprises a fifth switch connected between P2in2 842 and P2out1 846, a sixth switch connected between P2in2 842 and P2out2 847, a first diode having an anode connected to P2in1 841 and a cathode connected to P2out1 846, and a second diode having an anode connected to P2out2 847 and a cathode connected to P2in1 841. The second control signal 882 having the instantaneous signal value that indicates RC1 configures the fifth switch to be switched on, and configures the sixth switch to be switched off. In addition, the second control signal 882 having the instantaneous signal value that indicates RC2 configures the fifth switch to be switched off, and configures the sixth switch to be switched on.

Preferably, the first switch, the second switch, the third switch, the fourth switch, the fifth switch and the sixth switch are active switches. Each of the active switches is preferably a MOSFET switch. In practical realizations, preferably the first diode and the second diode are power diodes.

In the embodiments disclosed herein, the control unit 880 may be implemented using general purpose or specialized computing devices, computer processors, microcontrollers, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, microcontrollers, or programmable logic devices can readily be prepared by practitioners skilled in the software or electronic art based on the teachings of the present disclosure.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A battery charger for converting an AC voltage to a DC output voltage usable for battery charging, the AC voltage having an AC frequency and being obtainable from an AC source, the battery charger comprising:
   a control unit configured to generate a first control signal and a second control signal, each of the two control signals being substantially similar to a periodic pulse train, an instantaneous signal value of each of the two control signals indicating either a first required configuration RC1 or a second required configuration RC2, the two control signals being substantially mutually-synchronized with a time delay between the two control signals;
   a rectification circuit for rectifying the AC voltage to thereby generate a rectified voltage across two output terminals of the rectification circuit;
   a first controllable switching circuit having P1in1 and P1in2 as two input ports and P1out1 and P1out2 as two output ports, P1in1 and P1in2 being one-by-one coupled to the two output terminals of the rectification circuit for receiving the rectified voltage, the first controllable switching circuit being reconfigurable in response to the first control signal;
   a high-frequency transformer having a first winding and a second winding, each of the two windings having two terminals;
   a series resonant tank comprising a resonating inductor and a resonating capacitor connected in series, the series resonant circuit being further series-connected to the first winding to give a resultant cascade, the cascade having two ends connected to P1out1 and P1out2 for allowing an exciting current to flow through the cascade to excite the second winding; and
   a second controllable switching circuit having P2in1 and P2in2 as two input ports one-by-one connected to the two terminals of the second winding, and having P2out1 and P2out2 as two output ports such that the DC output voltage is obtainable across P2out1 and P2out2, the second controllable switching circuit being reconfigurable in response to the second control signal;
   wherein:
   the first control signal having the instantaneous signal value that indicates RC1 configures the first controllable switching circuit to connect P1in1 to P1out1, and P1in2 to P1out2;
   the first control signal having the instantaneous signal value that indicates RC2 configures the first controllable switching circuit to connect P1in1 to P1out2, and P1in2 to P1out1;
   when a voltage difference measured from P1out1 to P1out2 is substantially higher than zero, the second control signal having the instantaneous signal value that indicates RC1 configures P2in1 and P2in2 to be shorted together, and P2out1 and P2out2 to be disconnected from any of P2in1 and P2in2;
   when the voltage difference is substantially higher than zero, the second control signal having the instantaneous signal value that indicates RC2 configures P2in1 to connect to P2out1, and P2in2 to connect to P2out2;
   when the voltage difference is substantially lower than zero, the second control signal having the instantaneous signal value that indicates RC1 configures P2in1 to connect to P2out1, and P2in2 to connect to P2out2;
   when the voltage difference is substantially lower than zero, the second control signal having the instantaneous signal value that indicates RC2 configures P2in1 and P2in2 to be shorted together, and P2out1 and P2out2 to be disconnected from any of P2in1 and P2in2; and
   the control unit is further configured to real-time adjust the time delay such that the exciting current has a waveform substantially phase-aligned with the first control signal's waveform, thereby facilitating power factor correction.

2. The battery charger of claim 1, wherein the time delay is real-time adjusted every half-cycle time of the AC voltage.

3. The battery charger of claim 1, further comprising a first high-frequency capacitor connected between the two output terminals of the rectification circuit.

4. The battery charger of claim 1, further comprising a second high-frequency capacitor connected between P2out1 and P2out2.

5. The battery charger of claim 1, wherein the rectification circuit is a full-wave diode rectifier.

6. The battery charger of claim 1, wherein the first controllable switching circuit comprises:
   a first switch connected between P1in1 and P1out1;
   a second switch connected between P1in2 and P1out1;
   a third switch connected between P1in1 and P1out2; and
   a fourth switch connected between P1in2 and P1out2.

7. The battery charger of claim 6, wherein the first, the second, the third and the fourth switches are active switches.

8. The battery charger of claim 7, wherein each of the active switches includes a metal-oxide field effect transistor (MOSFET).

9. The battery charger of claim 6, wherein:
the first control signal having the instantaneous signal value that indicates RC1 configures the first switch and the fourth switch to be switched on, and configures the second switch and the third switch to be switched off; and the first control signal having the instantaneous signal value that indicates RC2 configures the first switch and the fourth switch to be switched off, and configures the second switch and the third switch to be switched on.

10. The battery charger of claim 1, wherein the second controllable switching circuit comprises:
a fifth switch connected between P2in2 and P2out1;
a sixth switch connected between P2in2 and P2out2;
a first diode having an anode connected to P2in1 and a cathode connected to P2out1; and
a second diode having an anode connected to P2out2 and a cathode connected to P2in1.

11. The battery charger of claim 10, wherein the fifth and the sixth switches are active switches.

12. The battery charger of claim 11, wherein each of the active switches includes a metal-oxide field effect transistor (MOSFET).

13. The battery charger of claim 10, wherein:
the second control signal having the instantaneous signal value that indicates RC1 configures the fifth switch to be switched on, and configures the sixth switch to be switched off; and the second control signal having the instantaneous signal value that indicates RC2 configures the fifth switch to be switched off, and configures the sixth switch to be switched on.

14. The battery charger of claim 10, wherein each of the first diode and the second diode is a power diode.

15. The battery charger of claim 10, wherein the first controllable switching circuit comprises:
a first switch connected between P1in1 and P1out1;
a second switch connected between P1in2 and P1out1;
a third switch connected between P1in1 and P1out2; and
a fourth switch connected between P1in2 and P1out2.

16. The battery charger of claim 15, wherein the first, the second, the third, the fourth, the fifth and the sixth switches are active switches.

17. The battery charger of claim 16, wherein each of the active switches includes a metal-oxide field effect transistor (MOSFET).

18. The battery charger of claim 15, wherein:
the first control signal having the instantaneous signal value that indicates RC1 configures the first switch and the fourth switch to be switched on, and configures the second switch and the third switch to be switched off;

the first control signal having the instantaneous signal value that indicates RC2 configures the first switch and the fourth switch to be switched off, and configures the second switch and the third switch to be switched on;

the second control signal having the instantaneous signal value that indicates RC1 configures the fifth switch to be switched on, and configures the sixth switch to be switched off; and the second control signal having the instantaneous signal value that indicates RC2 configures the fifth switch to be switched off, and configures the sixth switch to be switched on.

19. The battery charger of claim 15, wherein each of the first diode and the second diode is a power diode.

* * * * *